US010731507B2

(12) United States Patent
Engebretsen et al.

(10) Patent No.: US 10,731,507 B2
(45) Date of Patent: Aug. 4, 2020

(54) FAN CASE ASSEMBLIES

(71) Applicants: Rolls-Royce Corporation, Indianapolis, IN (US); Rolls-Royce North American Technologies, Inc., Indianapolis, IN (US)

(72) Inventors: Eric W. Engebretsen, Zionsville, IN (US); Daniel E. Molnar, Jr., Lebanon, IN (US); Matthew J. Kappes, Greenwood, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 1298 days.

(21) Appl. No.: 14/839,113

(22) Filed: Aug. 28, 2015

(65) Prior Publication Data

US 2016/0069214 A1 Mar. 10, 2016

Related U.S. Application Data

(60) Provisional application No. 62/048,044, filed on Sep. 9, 2014.

(51) Int. Cl.
*F01D 21/04* (2006.01)
*F01D 25/24* (2006.01)

(52) U.S. Cl.
CPC .......... *F01D 21/045* (2013.01); *F01D 25/24* (2013.01); *Y02T 50/672* (2013.01)

(58) Field of Classification Search
CPC ....... F01D 25/24; F01D 21/045; Y02T 50/672
USPC .......................................................... 415/220
See application file for complete search history.

(56) References Cited

U.S. PATENT DOCUMENTS

| | | | | |
|---|---|---|---|---|
| 4,565,492 A | * | 1/1986 | Bart ........................ | F01D 11/18 415/116 |
| 5,176,495 A | * | 1/1993 | Honkomp ............. | F01D 25/145 415/173.1 |
| 5,238,365 A | * | 8/1993 | Petsche .................... | F01D 9/00 415/170.1 |
| 5,336,044 A | | 8/1994 | Forrester | |
| 7,596,954 B2 | | 10/2009 | Penda et al. | |
| 7,721,433 B2 | | 5/2010 | Thompson et al. | |
| 8,052,385 B2 | * | 11/2011 | Thompson ............. | F01D 11/08 415/209.2 |
| 8,128,349 B2 | | 3/2012 | Lutjen et al. | |
| 8,142,144 B2 | | 3/2012 | Porte et al. | |
| 8,197,191 B2 | | 6/2012 | Binks et al. | |
| 8,206,092 B2 | | 6/2012 | Tholen et al. | |
| 8,267,642 B2 | | 9/2012 | Binks | |
| 9,115,596 B2 | * | 8/2015 | Clouse .................... | F01D 25/00 |
| 9,429,038 B2 | * | 8/2016 | Sahores ................ | F01D 21/045 |
| 9,803,491 B2 | * | 10/2017 | Clouse .................. | F01D 11/005 |
| 2013/0195635 A1 | | 8/2013 | Robertson, Jr. et al. | |

* cited by examiner

*Primary Examiner* — Thai Ba Trieu
*Assistant Examiner* — Dapinder Singh
(74) *Attorney, Agent, or Firm* — Barnes & Thornburg LLP (57) ABSTRACT

A fan case for use in a gas turbine engine of an aircraft includes an outer shroud and a liner extending along the outer shroud. The fan case provides a protective band that blocks fan blades from being thrown out of the fan case in case of a blade-off event in which a fan blade is released during operation of the gas turbine engine.

20 Claims, 8 Drawing Sheets

FAN CASE ASSEMBLIES

CROSS REFERENCE TO RELATED APPLICATIONS

This application claims priority to and the benefit of U.S. Provisional Patent Application No. 62/048,044, filed 9 Sep. 2014, the disclosure of which is now expressly incorporated herein by reference

FIELD OF THE DISCLOSURE

The present disclosure relates generally to gas turbine engines and more specifically to fan containment cases for gas turbine engines.

BACKGROUND

Gas turbine engines used in aircraft often include a fan assembly that is driven by an engine core to push air through the engine and provide thrust for the aircraft. A typical fan assembly includes a fan rotor having blades and a fan case that extends around the blades of the fan rotor. During operation, the fan blades of the fan rotor are rotated to push air through the engine. The fan case both guides the air pushed by the fan blades and provides a protective band that blocks fan blades from being thrown out of the fan assembly in case of a blade-off event in which a fan blade is released from the fan rotor.

Fan cases sometimes include metallic shrouds and liners positioned between the metallic shroud and the fan blades. Liners are generally used to achieve a desired dimensional tolerance between the fan blades and the fan case. The distance between the fan blades and the fan case may vary due to variations in dimensional tolerances or thermo-mechanical deflections. As such, liners may include an abraidable layer that the fan blades may contact without damaging the shroud. Liners may be coupled to metallic shrouds by hanger features that extend from the metallic shrouds or by adhesives that provide a permanent bond to the metallic shrouds. Over time, the liners may need to be repaired or replaced.

SUMMARY

The present disclosure may comprise one or more of the following features and combinations thereof.

A fan case may include an annular outer shroud, a first liner segment, a second liner segment, and a liner plate. The annular outer shroud may be arranged to extend around a central axis of the fan case. The first liner segment may be coupled to the annular outer shroud. The second liner segment may be coupled to the annular outer shroud. The liner plate may be coupled to the first liner segment and the second liner segment to cause the second liner segment to move in response to movement of the first liner segment.

In some embodiments, the first liner segment may include an outer radial surface and an inner radial surface. The outer radial surface may be coupled to an inner surface of the annular outer shroud arranged to face toward the central axis. The inner radial surface may be radially spaced apart from the outer radial surface. The liner plate may be coupled to the outer radial surface of the first liner segment.

In some embodiments, the first liner segment may include an intermediate surface extending between the inner radial surface and the outer radial surface. The intermediate surface may intersect the outer radial surface to define a front edge of the first liner segment. The liner plate may extend circumferentially along the front edge of the first liner segment.

In some embodiments, the second liner segment may include an outer radial surface and an inner radial surface. The outer radial surface may be coupled to the inner surface of the annular outer shroud. The inner radial surface may be radially spaced apart from the outer radial surface. The liner plate may be coupled to the outer radial surface of the second liner segment.

In some embodiments, the first liner segment may include an intermediate surface extending between the inner radial surface and the outer radial surface. The intermediate surface may intersect the outer radial surface to define a front edge of the first liner segment. The second liner segment may include an intermediate surface extending between the inner radial surface and the outer radial surface. The intermediate surface may intersect the outer radial surface to define a front edge of the second liner segment. The liner plate may extend circumferentially along the front edge of the first and second liner segments.

In some embodiments, the first liner segment may include an intermediate surface extending between the inner radial surface and the outer radial surface. The intermediate surface may intersect the outer radial surface to define a front edge of the first liner segment. The liner plate may be spaced apart axially from the front edge of the first liner segment.

In some embodiments, the second liner segment may include an outer radial surface, an inner radial surface, and an intermediate surface. The outer radial surface may be coupled to the inner surface of the annular outer shroud. The inner radial surface may be radially spaced apart from the outer radial surface. The intermediate surface may extend between the inner radial surface and the outer radial surface. The intermediate surface may intersect the outer radial surface to define a front edge of the second liner segment. The liner plate may be coupled to the outer radial surface of the second liner segment and may be spaced apart axially from the front edge of the second liner segment.

In some embodiments, the liner plate may include a band and a strip. The band may be aligned to extend circumferentially between the first and second liner segments. The strip may be arranged to extend axially along the first and second liner segments.

In some embodiments, the band may have a band axial thickness. The strip may have a strip axial thickness that is greater than the band axial thickness.

In some embodiments, the first liner segment may include an outer radial surface, an inner radial surface, and an intermediate surface. The outer radial surface may be coupled to an inner surface of the annular outer shroud. The inner radial surface may be radially spaced apart from the outer radial surface. The intermediate surface may extend between the inner radial surface and the outer radial surface. The intermediate surface may intersect the outer radial surface to define a front edge of the first liner segment. The second liner segment may include an outer radial surface, an inner radial surface, and an intermediate surface. The outer radial surface may be coupled to the inner surface of the annular outer shroud. The inner radial surface may be radially spaced apart from the outer radial surface. The intermediate surface may extend between the inner radial surface and the outer radial surface. The intermediate surface may intersect the outer radial surface to define a front edge of the second liner segment. The band of the liner plate may extend circumferentially along the front edge of the first and second liner segments.

In some embodiments, the first liner segment may include an outer radial surface and an inner radial surface. The outer radial surface may be coupled to an inner surface of the annular outer shroud arranged to face toward the central axis. The inner radial surface may be radially spaced apart from the outer radial surface. The liner plate may be coupled to the inner radial surface of the first liner segment.

In some embodiments, the first liner segment may include an intermediate surface extending between the inner radial surface and the outer radial surface. The intermediate surface may intersect the outer radial surface to define a front edge of the first liner segment. The liner plate may extend circumferentially along the front edge of the first liner segment.

In some embodiments, the second liner segment may include an outer radial surface and an inner radial surface. The outer radial surface may be coupled to the inner surface of the annular outer shroud. The inner radial surface may be radially spaced apart from the outer radial surface. The liner plate may be coupled to the inner radial surface of the second liner segment.

In some embodiments, the first liner segment may include an intermediate surface extending between the inner radial surface and the outer radial surface. The intermediate surface may intersect the outer radial surface to define a front edge of the first liner segment. The second liner segment may include an intermediate surface extending between the inner radial surface and the outer radial surface. The intermediate surface may intersect the outer radial surface to define a front edge of the second liner segment. The liner plate may extend circumferentially along the front edge of the first and second liner segments.

In some embodiments, the first liner segment may include an intermediate surface extending between the inner radial surface and the outer radial surface. The intermediate surface may intersect the outer radial surface to define a front edge of the first liner segment. The liner plate may be spaced apart axially from the front edge of the first liner segment.

In some embodiments, the first liner segment may include an outer radial surface and an inner radial surface. The outer radial surface may be coupled to an inner surface of the annular outer shroud. The inner radial surface may be radially spaced apart from the outer radial surface. The liner plate may be coupled to the outer radial surface of the first liner segment. The second liner segment may include an outer radial surface and an inner radial surface. The outer radial surface may be coupled to the inner surface of the annular outer shroud. The inner radial surface may be radially spaced apart from the outer radial surface. The liner plate may be coupled to the inner radial surface of the second liner segment.

In some embodiments, the first liner segment may include an intermediate surface extending between the inner radial surface and the outer radial surface. The intermediate surface may intersect the outer radial surface to define a front edge of the first liner segment. The liner plate may extend circumferentially along the front edge of the first liner segment.

In some embodiments, the first liner segment may include an intermediate surface extending between the inner radial surface and the outer radial surface. The intermediate surface may intersect the outer radial surface to define a front edge of the first liner segment. The liner plate may be spaced apart axially from the front edge of the first liner segment.

In some embodiments, the second liner segment may be circumferentially spaced apart from the first liner segment to form a gap therebetween. The liner plate may extend through the gap between the outer radial surface of the first liner segment and the inner radial surface of the second liner segment.

In some embodiments, the annular outer shroud may extend between a front end of the fan case and a back end of the fan case. The annular outer shroud may include a front hook, a back hook, and an intermediate hook. The front hook may be adjacent to the front end of the fan case. The back hook may be adjacent to the back end of the fan case. The intermediate hook may be located axially between the front and back hooks. The first and second liner segments may be formed to be radially spaced apart from an inner surface of the annular outer shroud between the front and intermediate hooks to form a blade-retention cavity therebetween. The liner plate may be located axially between the front and intermediate hooks.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figures 1, 2:
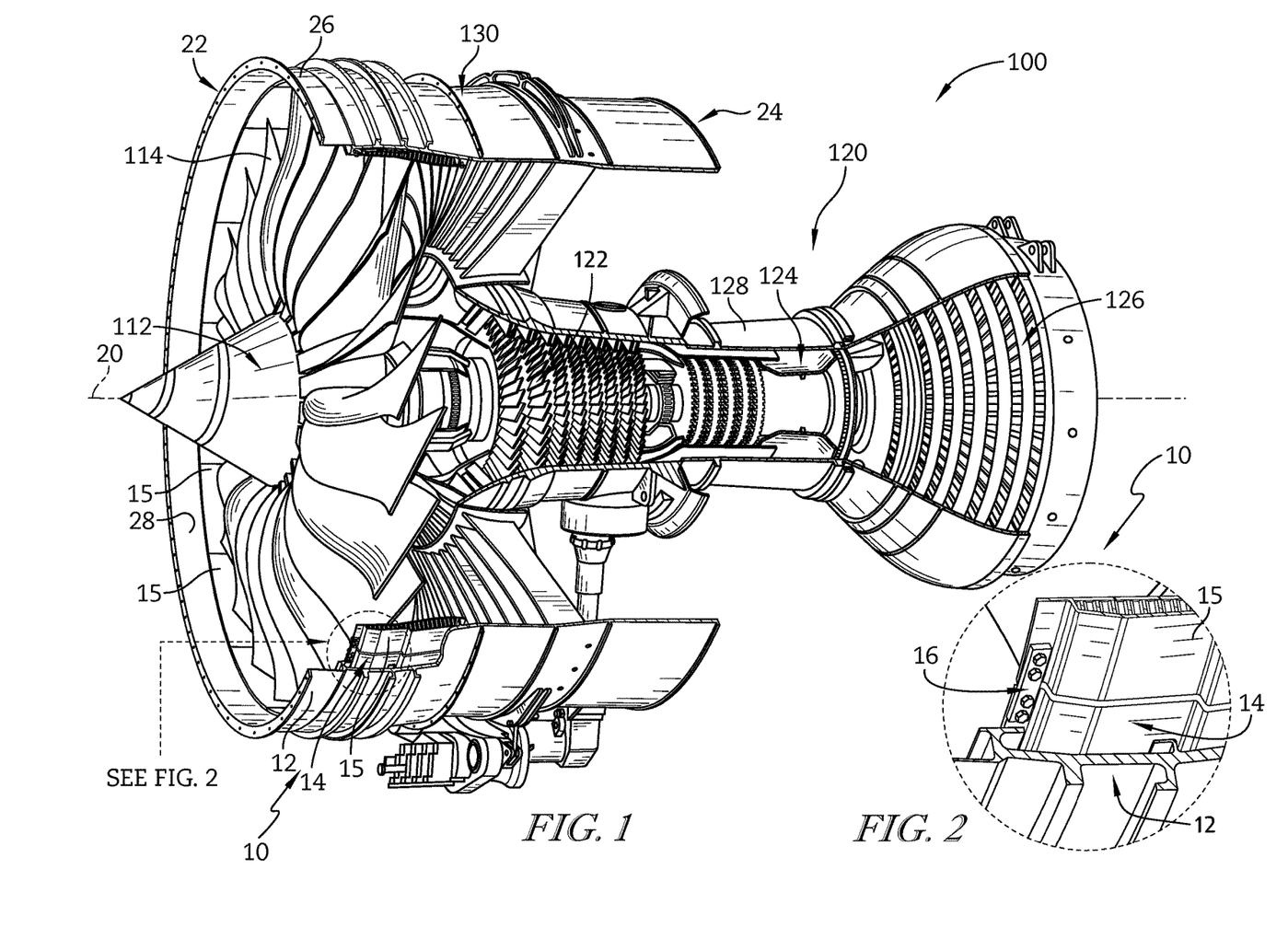
FIG. 1 is a perspective view of a gas turbine engine with portions broken away showing that the gas turbine engine includes a fan case that surrounds fan blades included in a fan rotor and showing that the fan case includes an annular outer shroud and a liner formed by a number of liner segments positioned between the fan blades and the annular outer shroud.
FIG. 2 is an enlarged view of the fan case of FIG. 1 showing a liner plate extending between and interconnecting two spaced apart liner segments to cause the liner segments to move together in response to movement of one of the liner segments.

An illustrative gas turbine engine 100 used in aircraft includes a fan assembly 130 driven by an engine core 120 to push air through the engine 100 and provide thrust for the aircraft as suggested in FIG. 1. The illustrative fan assembly 130 includes a fan rotor 112 having a number of fan blades 114 and a fan case 10 that extends around the fan blades 114 of the fan rotor 112. The fan case 10 both guides the air pushed by the fan blades 114 and provides a retention feature for blocking fan blades 114 from being thrown out of the fan assembly 130 in case of a blade-off event in which at least one of the fan blades 114 is released from the fan rotor 112 during operation of the gas turbine engine 100.

Figure 3:
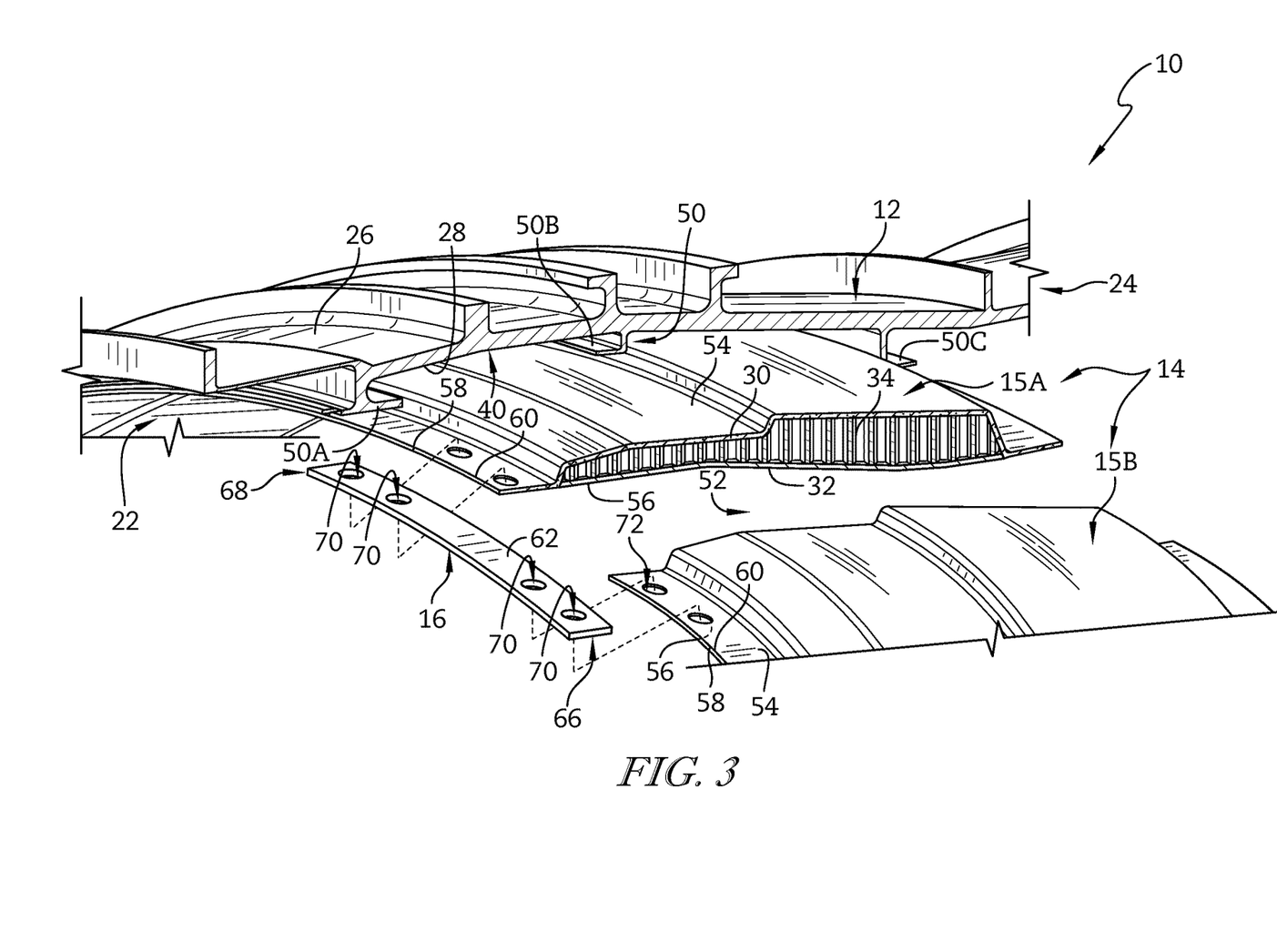
FIG. 3 is an enlarged cutaway view of the fan case of FIG. 1 showing the annular outer shroud, the first and second liner segments of the fan case arranged along an inner surface of the annular outer shroud, and the liner plate and suggesting that the liner plate couples to the first and second liner segments.

The fan case 10 extends around and along a central axis 20 of the engine 100 (sometimes called a central axis 20 of the fan case 10) between a front end 22 (sometimes called the front of the fan case 10) and a back end 24 (sometimes called the back of the fan case 10) as shown in FIG. 1. The fan case 10 illustratively includes an annular outer shroud 12, a liner 14, and a number of liner plates 16 as shown in FIG. 2. The annular outer shroud 12 includes an inner surface 28 facing toward the central axis 20 and an outer surface 26 facing away from the central axis 20 as shown in FIGS. 1 and 3. The liner 14 is arranged along the inner surface 28 of the annular outer shroud 12 to reinforce the annular outer shroud 12. In the illustrative embodiment, the liner 14 is formed from a plurality of circumferentially-extending liner segments 15 that cooperate to define a full ring. Each liner plate 16 couples a number of liner segments 15 together to cause the liner segments 15 to move together relative to the central axis 20 in response to a force applied to one of the liner segments 15.

Figure 5:
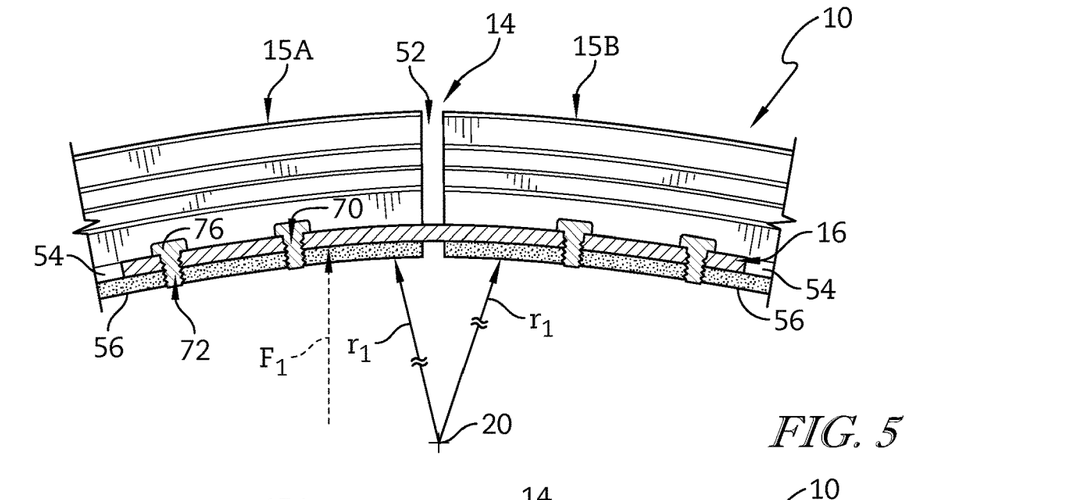
FIG. 5 is an elevated view of the fan case of FIG. 1 showing the first liner segment and the second liner segment spaced apart from a central axis of the engine and showing the liner plate coupled to the outer radial surface of the first liner segment and the second liner segment by fasteners.

A first liner segment 15A is coupled to the inner surface 28 of the annular outer shroud 12 as shown in FIG. 5. A second liner segment 15B is coupled to the annular outer shroud 12 and is spaced apart from the first liner segment 15A by a gap 52. The liner plate 16 extends across the gap 52 and couples together the first and second liner segments 15A, 15B.

Figure 6:
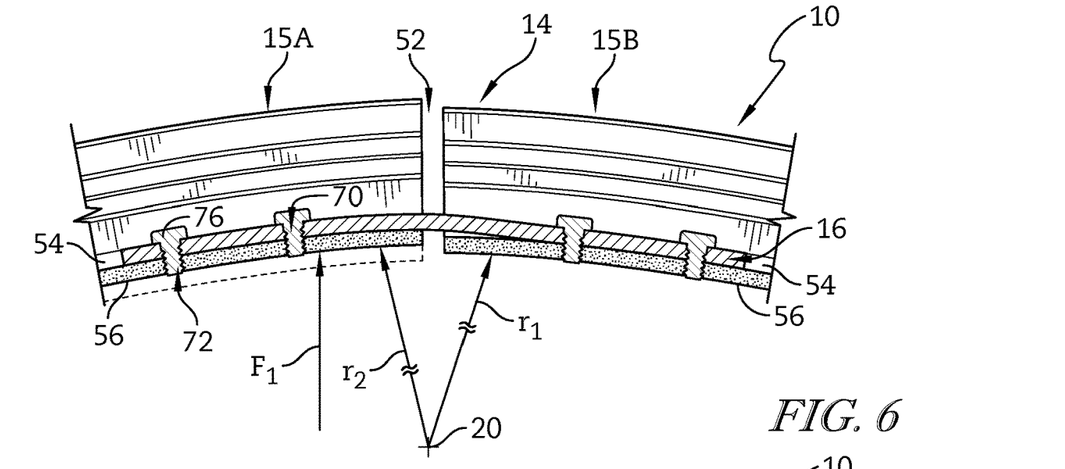
FIG. 6 is a view similar to FIG. 5 showing the first liner segment has been moved radially outward relative to the central axis of the engine in response to a force applied to an inner radial surface of the first liner segment.
Figure 7:
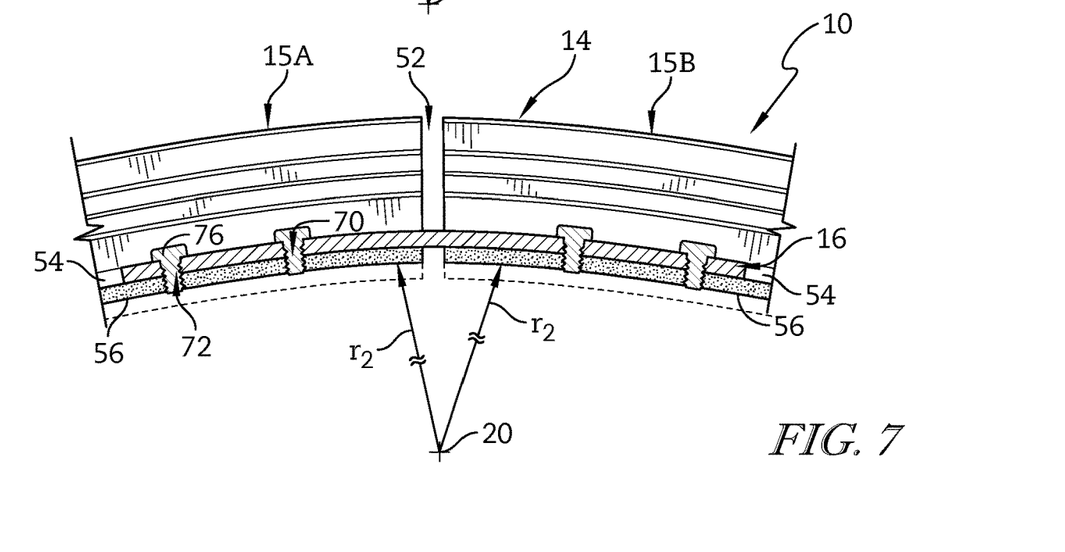
FIG. 7 is a view similar to FIG. 6 showing that the liner plate has transmitted the radially outward force applied to the first liner segment to the second liner segment to cause the second liner segment to move radially outward relative to the central axis of the engine along with the first liner segment.

During a blade-off event, at least one of the blades 114 applies a force $F_1$ to the first liner segment 15A in a radially outward direction away from the central axis 20 as suggested in FIG. 5. The force $F_1$ causes the first liner segment 15A to move radially outward relative to the central axis 20 as shown in FIG. 6. The liner plate 16 transmits the force applied to the first liner segment 15A to the second liner segment 15B to cause the second liner segment 15B to move radially outward such that the second liner segment 15B is spaced apart from the central axis 20 to provide a smooth transition between the liner segments 15A, 15B as the blade 114 rotates around the central axis 20 as shown in FIG. 7.

The fan case 10 includes the annular outer shroud 12, the liner 14, and the number of liner plates 16 as shown in FIG. 3. The annular outer shroud 12 extends circumferentially around the central axis 20 of the engine 100 and extends axially between the front end 22 and the back end 24 of the fan case 10 to block a released blade from escaping the fan assembly 130. The liner 14 is arranged along the inner surface 28 of the annular outer shroud 12 to reinforce the annular outer shroud 12. The liner plate 16 couples the liner segment 15A to the liner segment 15B for movement therewith.

The annular outer shroud 12 is illustratively an integral full ring arranged around the fan blades 114 as shown in FIG. 1. The annular outer shroud 12 includes the outer surface 26 facing outward in a radial direction away from the central axis 20 and the inner surface 28 facing inward in the radial direction toward the central axis 20 as shown in FIG. 3. In the illustrative embodiment, the annular outer shroud 12 is made from metal. In other embodiments, the annular outer shroud 12 is made from composite materials including a plurality of reinforcing fibers suspended in a matrix material.

Figure 4:
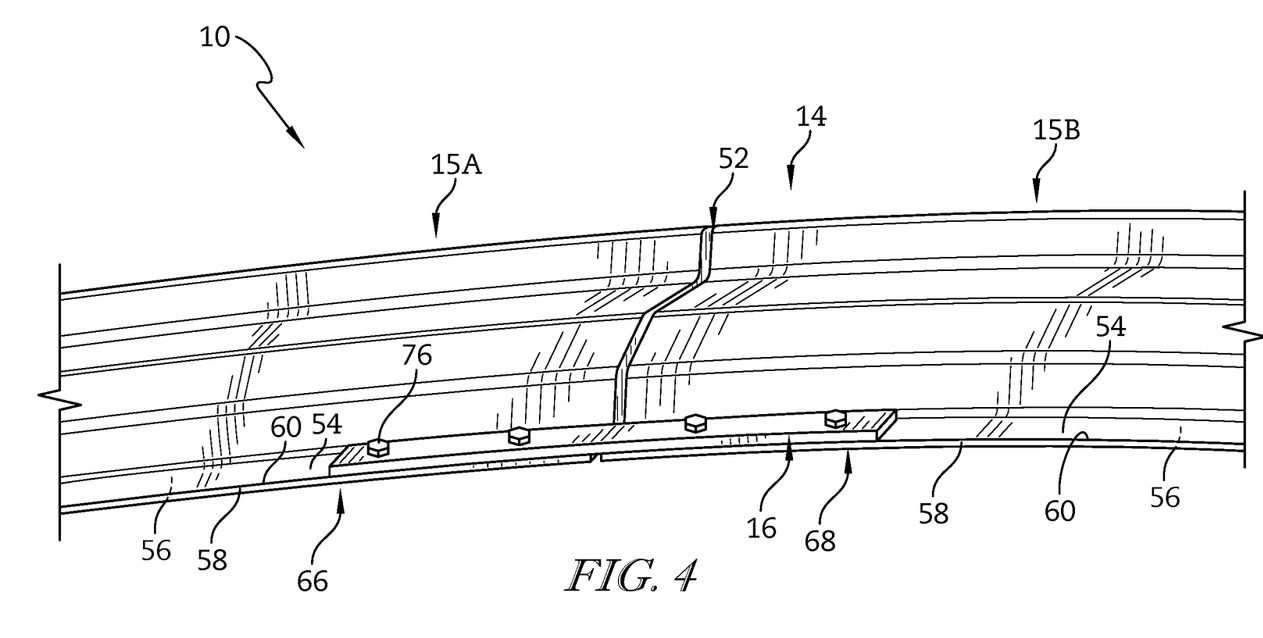
FIG. 4 is a perspective view of the fan case of FIG. 1 showing the first liner segment spaced apart from the second liner segment and that the liner plate is coupled to an outer radial surface of the first and second liner segments and extends circumferentially along a front edge of the first and second liner segments.

The plurality of liner segments 15 is arranged around the annular outer shroud 12 to form the liner 14 as shown in FIG. 1. Each liner segment 15 is spaced apart circumferentially from an adjacent liner segment 15 to form the gap 52 therebetween as shown in FIG. 4. The liner segments 15 are coupled together by the liner plate 16 to move therewith when a fan blade 114 is released to block the released blade 114 from escaping fan case 10. The second liner segment 15B is substantially the same as first liner segment 15A, and thus, only first liner segment 15A will be discussed in detail. In some embodiments, each liner segment 15 engages the adjacent liner segment 15 such that no gap 52 is formed between liner segments 15.

The first liner segment 15A includes an outer radial surface 54, an inner radial surface 56, and an intermediate surface 58 as shown in FIG. 3. The outer radial surface 54 faces away from the central axis 20 and is spaced apart from the central axis 20 by a first distance as shown in FIG. 5. The inner radial surface 56 faces toward the central axis 20 and is spaced apart from the central axis 20 by a second distance that is less than the first distance as shown in FIG. 5. The intermediate surface 58 extends between and interconnects the outer and inner radial surfaces 54, 56 and intersects the outer radial surface 54 to define a front edge 60 of the liner segment 15 as shown in FIG. 3.

Figure 8:
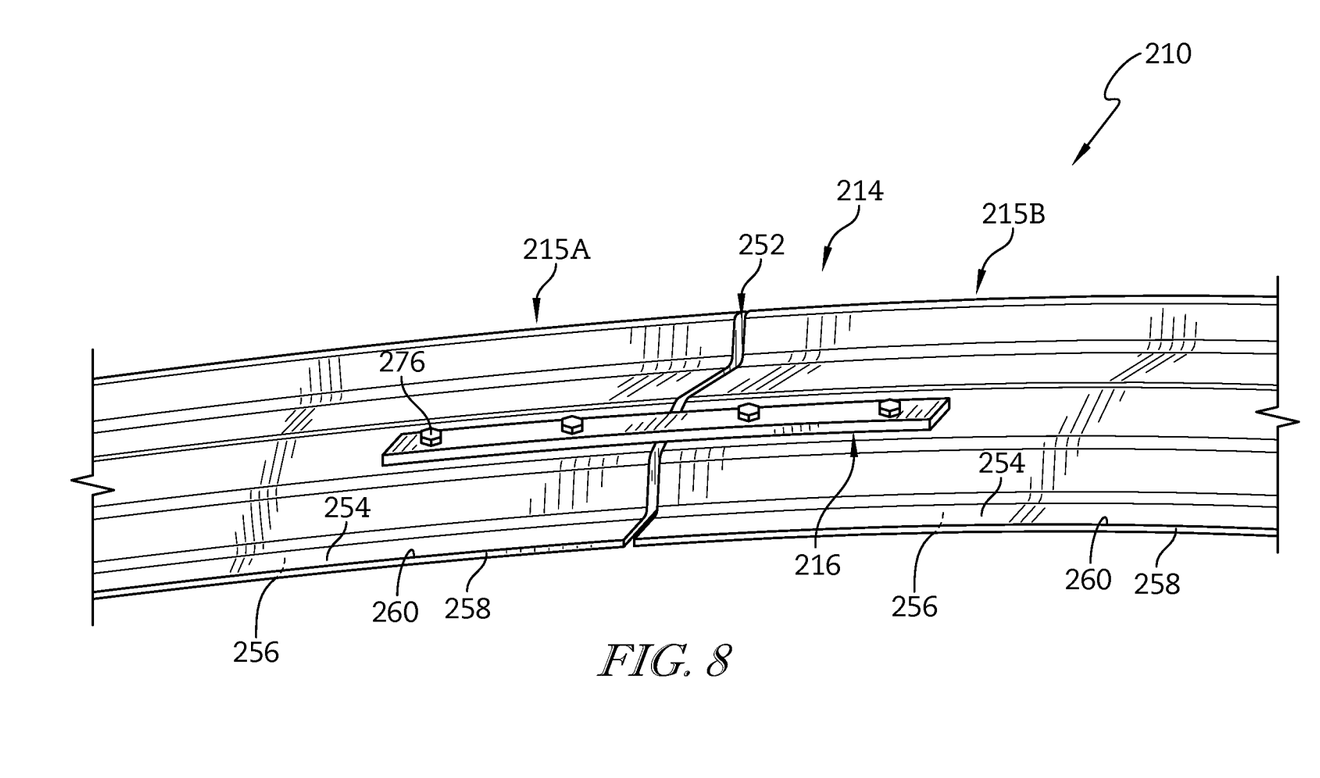
FIG. 8 is a perspective view of another embodiment of a fan case showing that the fan case includes a first liner segment, a second liner segment spaced apart from the first liner segment, and a liner plate coupled to an outer radial surface of the first and second liner segments and located in spaced-apart relation to a front edge of the first and second liner segments.

In the illustrative embodiment, each liner segment 15 is formed to include liner openings 72 as shown in FIG. 3. The liner openings 72 receive fasteners 76 that extend through the liner plate 16 and into the liner segment 15 to couple the liner plate 16 to the liner segment 15 as shown in FIG. 5. In the illustrative embodiment, the liner openings 72 extend through the outer and inner radial surfaces 54, 56 adjacent to the front edge 60 of the liner segment 15. In other embodiments, the liner openings 72 are spaced apart from the front edge 60 as shown in FIG. 8. In some embodiments, the liner openings 72 extend through one of the outer and inner radial surfaces 54, 56.

In the illustrative embodiment, the liner openings 72 are threaded to receive fasteners 76 as shown in FIG. 5. In other embodiments, the liner openings 72 are through holes and the fasteners 76 include a bolt and a nut. In other embodiments, the liner plate 16 may be bonded to the liner segment 15 with adhesive or other suitable materials and the liner segments 15 may omit the liner openings 72.

The liner plate 16 extends between the first liner segment 15A and the second liner segment 15B and over the gap 52 to couple the second liner segment 15B to the first liner segment 15A for movement therewith as shown in FIGS. 4 and 5. In the illustrative embodiment, the liner plate 16 extends along the outer radial surface 54 along the front edge 60 of the first liner segment 15A and the second liner segment 15B as shown in FIGS. 4 and 5. In the illustrative embodiment, the liner plate 16 is a band 62 formed to include one or more plate openings 70.

The liner plate 16 extends circumferentially between a first end 66 and a second end 68 relative to the central axis 20 as shown in FIG. 4. One or more plate openings 70 are formed in the liner plate 16 at each end 66, 68. The plate openings 70 align with liner openings 72 and receive fasteners 76 to couple the liner plate 16 to the liner segments 15A, 15B.

In operation, the inner radial surface 56 of the first liner segment 15A and the inner radial surface 56 of the second liner segment 15B are spaced apart from the central axis 20 by a first radius $r_1$ as shown in FIG. 5. The first liner segment 15A may move in a radially outward direction in response to a force $F_1$ such as, for example, when a released blade 114 contacts the first liner segment 15A as suggested in FIG. 6. The force $F_1$ causes the first liner segment 15A to move radially outward such that the first liner segment 15A is spaced apart from the central axis 20 by a second radius $r_2$ as shown in FIG. 6. The liner plate 16 transmits the force applied to the first liner segment 15A to the second liner segment 15B to cause the inner radial surface 56 of the second liner segment 15B to be spaced apart from the central axis 20 by the second radius $r_2$ to provide a smooth transition as the released blade 114 rotates around the central axis 20 as shown in FIG. 7.

The fan assembly 130 is mounted illustratively to the turbine engine core 120 to be driven by the engine core 120 as shown, for example, in FIG. 1. The engine core 120 includes a compressor 122, a combustor 124, and a turbine 126 all mounted to a case 128. The compressor 122 is configured to compress and deliver air to the combustor 124. The combustor 124 is configured to mix fuel with the compressed air received from the compressor 122 and to ignite the fuel. The hot high pressure products of the combustion reaction in the combustor 124 are directed into the turbine 126 and the turbine 126 extracts work to drive the compressor 122 and the fan assembly 130.

In the illustrative embodiment, the annular outer shroud 12 includes a number of liner mounts 50 that extend inward toward the central axis 20 as shown in FIG. 3. Fasteners extend through the liner 14 and the liner mounts 50 to couple the liner 14 to the annular outer shroud 12. In other embodiments, the liner 14 may be bonded to the annular outer shroud 12 by an adhesive or any other suitable alternatives.

In the illustrative embodiment, the liner mounts 50 include a front hook 50A adjacent to the front end 22 of the fan case 10, a back hook 50C adjacent to the back end 24 of the fan case 10, and an intermediate hook 50B located axially between the front and back hooks 50A, 50C as shown in FIG. 3. The liner 14 is spaced apart from the inner surface 28 of the annular outer shroud between the front and intermediate hooks 50A, 50B to form a blade-retention cavity 40. The liner 14 is arranged to deform into the blade-retention cavity 40 when contacted by a released blade to allow the front hook 50A to block exiting of the released blade 114 from the front end 22 of the fan case 10.

In the illustrative embodiment, the liner 14 is formed from the plurality of circumferentially-extending liner segments 15 that cooperate to define a full ring as shown in FIG. 1. Each liner segment 15 of the liner 14 is independently removable from the annular outer shroud 12 so that each liner segment 15 may be replaced without replacing one or more of the additional liner segments 15. Each liner segment 15 is coupled to the hooks 50A, 50B, 50C such that the liner segment 15 may be uncoupled from the annular outer shroud 12 by moving the liner segment 15 radially inward without moving the liner segment 15 axially relative to the annular outer shroud 12 as shown in FIG. 3.

In one illustrative example, each liner segment 15 includes an outer tray 30, an abraidable layer 32, and a liner-filler body 34 as shown in FIG. 3. The outer tray 30 couples the liner segment 15 to the annular outer shroud 12. The liner-filler body 34 reinforces the liner segment 15. The abraidable layer 32 confronts the fan blades 114 to provide an air flow path through the fan assembly 130. During typical use of the gas turbine engine 100, wear may occur to the abraidable layer 32 over time. As a result, the liner segment 15 may be replaced as part of routine or typical maintenance.

The outer tray 30 is coupled to the liner mounts 50 to couple the liner segment 15 to the annular outer shroud 12 as shown in FIG. 3. The liner segment 15 is coupled to the annular outer shroud 12 such that the blade-retention cavity 40 is formed between the outer tray 30 and the inner surface 28 of the annular outer shroud 12. The outer tray 30 is illustratively made of composite materials. In other embodiments, the outer tray is made from metal.

The liner-filler body 34 is positioned radially between the outer tray 30 and the abraidable layer 32 as shown in FIG. 3. In the illustrative embodiment, the liner-filler body 34 is bonded to the outer tray 30. In the illustrative embodiment, the liner-filler body 34 is a honeycomb made of aluminum.

The abraidable layer 32 is bonded to the liner-filler body 34 as shown in FIG. 3. During operation of the engine 100, one or more of the fan blades 114 may contact the abraidable layer 32 and cause portions of the abraidable layer 32 to separate from the liner segment 15 without harming the fan blades 114 or fan case 10 so that a dimensional tolerance between the fan blades 114 and the fan case 10 is achieved.

Another illustrative fan case 210 adapted for use in gas turbine engine 100 is shown in FIG. 8. The fan case 210 is substantially similar to the fan case 10 shown in FIGS. 1-7 and described herein. Accordingly, similar reference numbers in the 200 series indicate features that are common between the fan case 10 and the fan case 210. The description of the fan case 10 is hereby incorporated by reference to apply to the fan case 210, except in instances when it conflicts with the specific description and drawings of the fan case 210.

The fan case 210 includes the annular outer shroud 212, the liner 214, and a number of liner plates 216. The first liner segment 215A, the second liner segment 215B spaced apart from the first liner segment 215A, and one of the liner plates 216 is shown in FIG. 8.

In the illustrative embodiment, the liner openings 272 formed in the liner segments 215A, 215B are spaced apart from the front edge 260 as shown in FIG. 8. The liner plate 216 extends along the outer radial surface 254 of the first liner segment 215A and the second liner segment 215B. The liner plate 216 is spaced apart axially from the front edge 260 of the first and second liner segments 215A, 215B as shown in FIG. 8. In the illustrative embodiment, the liner plate 216 is coupled to the liner segments such that the liner plate 216 is located axially between the front hook 250A and the intermediate hook 250B of the annular outer shroud 212.

Figure 9:
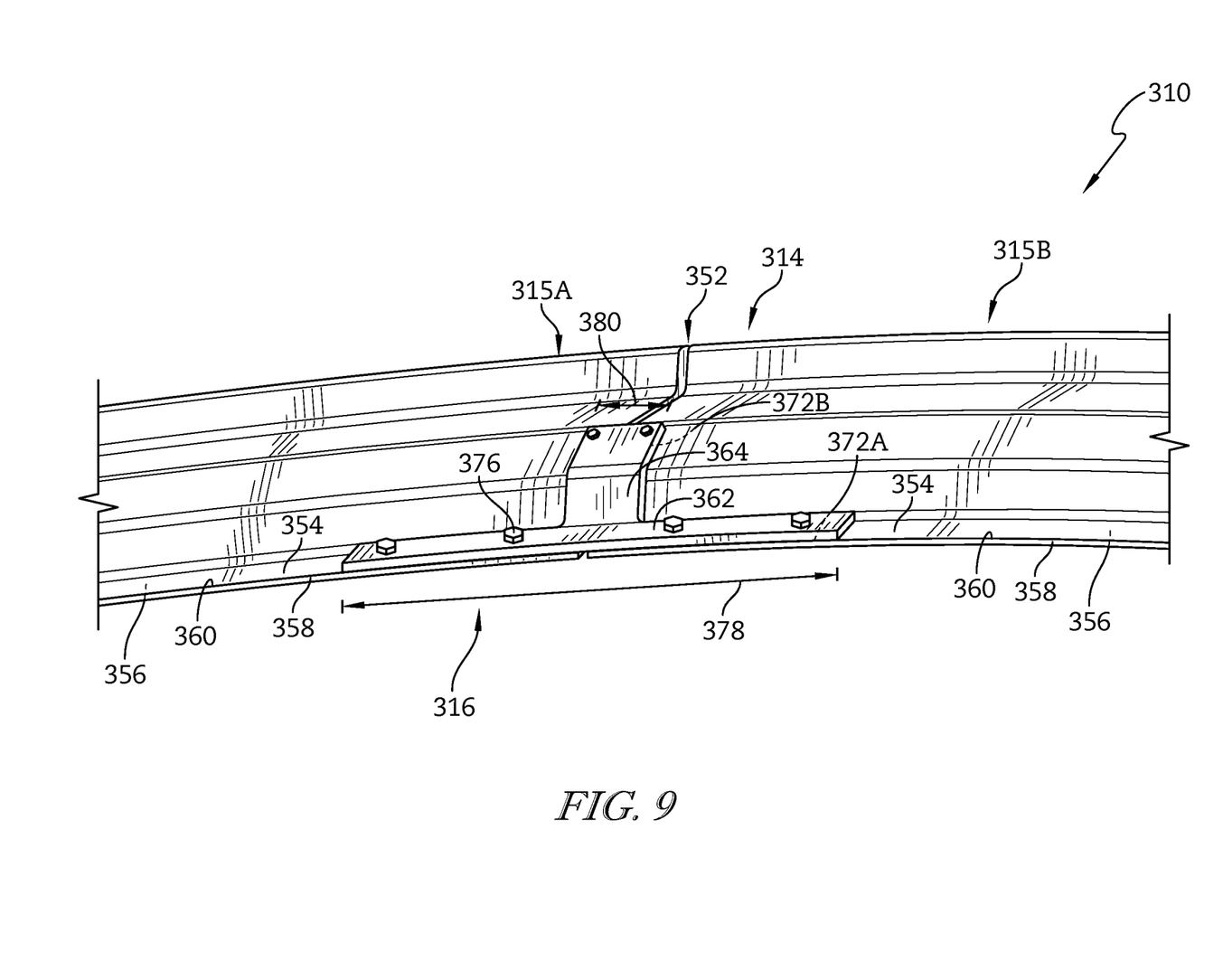
FIG. 9 is a perspective view of another embodiment of a fan case showing that the fan case includes a first liner segment, a second liner segment spaced apart from the first liner segment, and a liner plate coupled to an outer radial surface of the first and second liner segments and that the liner plate includes a first portion extending circumferentially along a front edge of the first and second liner segments and a second portion extending axially from the first portion toward a rear edge of the first and second liner segments.

Another illustrative fan case 310 adapted for use in gas turbine engine 100 is shown in FIG. 9. The fan case 310 is substantially similar to the fan case 10 shown in FIGS. 1-7 and described herein. Accordingly, similar reference numbers in the 300 series indicate features that are common between the fan case 10 and the fan case 310. The description of the fan case 10 is hereby incorporated by reference to apply to the fan case 310, except in instances when it conflicts with the specific description and drawings of the fan case 310.

The fan case 310 includes the annular outer shroud 312, the liner 314, and a number of liner plates 316. The first liner segment 315A, the second liner segment 315B spaced apart from the first liner segment 315A, and one of the liner plates 316 is shown in FIG. 9. A number of first liner openings 372A are formed in the liner segments 315A, 315B and are located along the font edge 360 of the first and second liner segments 315A, 315B. A number of second liner openings 372B are formed in the liner segments 315A, 315B and are spaced apart from the front edge 360 as shown in FIG. 9.

The liner plate 316 includes a band 362 and a strip 364 as shown in FIG. 9. The band 362 is aligned to extend circumferentially along the front edge 360 of the first and second liner segments 315A, 315B. The strip 364 is spaced apart from the front edge 360 and arranged to extend across the gap 352 and axially along the first and second liner segments 315A, 315B. Fasteners extend through the band 362 and the first liner openings 372A to couple the band 362 to the first and second liner segments 315A, 315B. Fasteners extend through the strip 364 and the second liner openings 372B to couple the strip 364 to the first and second liner segments 315A, 315B. The band 362 has a band axial thickness 378 and the strip 364 has a strip axial thickness 380 that is greater than the band axial thickness 378. Another embodiment of a liner plate in accordance with the present disclosure may include only a strip which extends axially along the first and second liner segments.

Figure 10:
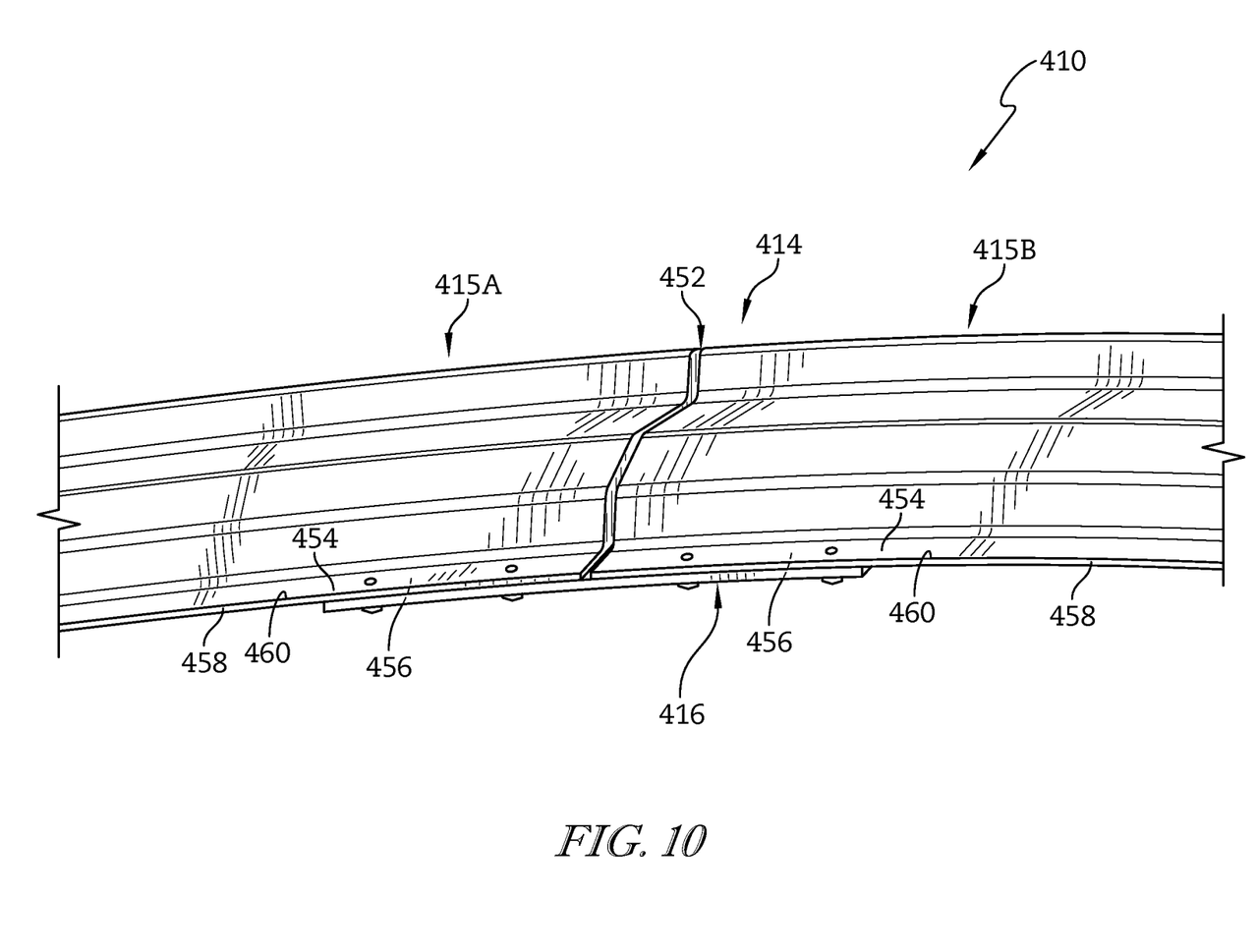
FIG. 10 is a perspective view of another embodiment of a fan case showing that the fan case includes a first liner segment, a second liner segment spaced apart from the first liner segment, and a liner plate coupled to an inner radial surface of the first and second liner segments and extending circumferentially along a front edge of the first and second liner segments.

Another illustrative fan case 410 adapted for use in gas turbine engine 100 is shown in FIG. 10. The fan case 410 is substantially similar to the fan case 10 shown in FIGS. 1-7 and described herein. Accordingly, similar reference numbers in the 400 series indicate features that are common between the fan case 10 and the fan case 410. The description of the fan case 10 is hereby incorporated by reference to apply to the fan case 410, except in instances when it conflicts with the specific description and drawings of the fan case 410.

The fan case 410 includes the annular outer shroud 412, the liner 414, and a number of liner plates 416. The first liner segment 415A, the second liner segment 415B spaced apart from the first liner segment 415A, and one of the liner plates 416 is shown in FIG. 10.

The liner plate 416 extends along the inner radial surface 456 of the first liner segment 415A and the second liner segment 415B as shown in FIG. 10. The liner plate 416 is coupled to the first and second liner segments 415A, 415B along the front edge 460 of the first and second liner segments 415A, 415B.

Figure 11:
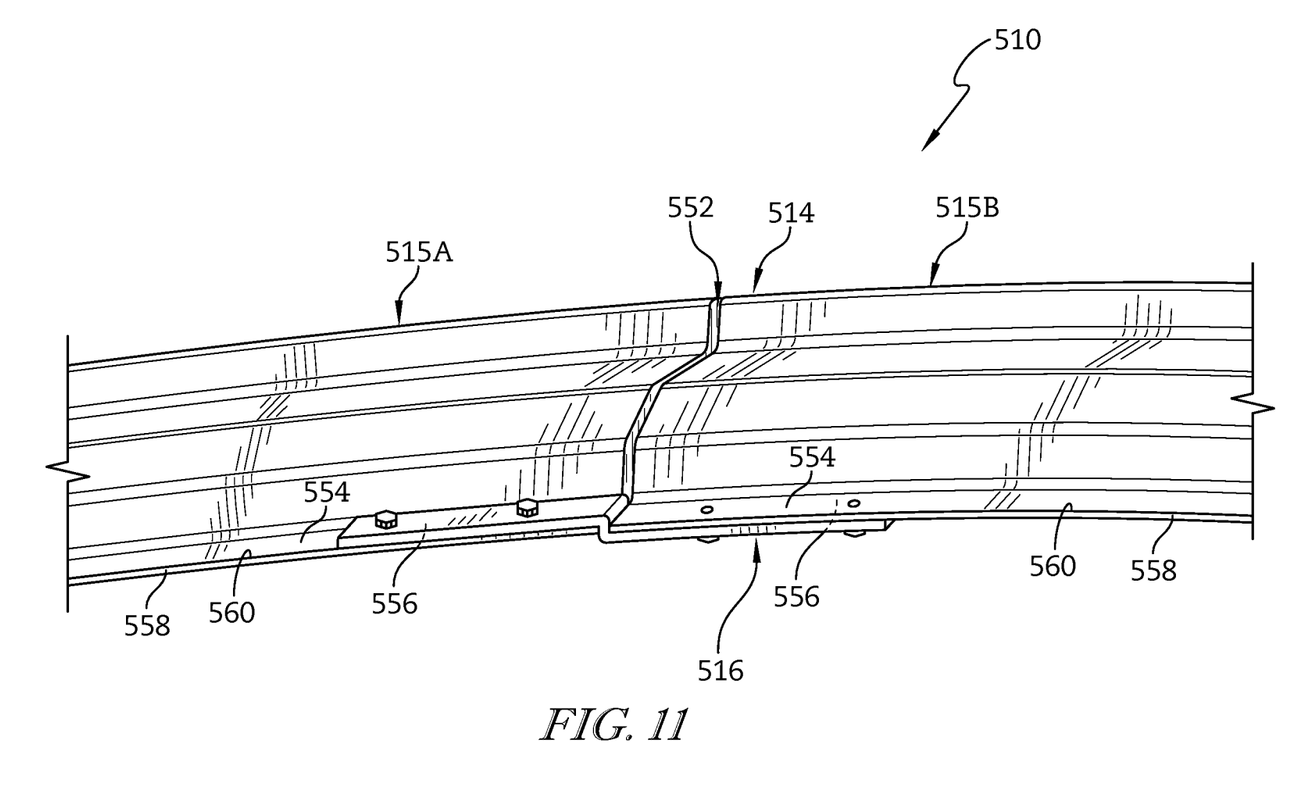
FIG. 11 is a perspective view of another embodiment of a fan case showing that the fan case includes a first liner segment, a second liner segment spaced apart from the first liner segment, and a liner plate and showing that the liner plate is coupled to an outer radial surface of the first liner segment, arranged to extend radially inward through a gap formed between the liner segments, and coupled to an inner radial surface of the second liner segment.

Another illustrative fan case 510 adapted for use in gas turbine engine 100 is shown in FIG. 11. The fan case 510 is substantially similar to the fan case 10 shown in FIGS. 1-7 and described herein. Accordingly, similar reference numbers in the 500 series indicate features that are common between the fan case 10 and the fan case 510. The description of the fan case 10 is hereby incorporated by reference to apply to the fan case 510, except in instances when it conflicts with the specific description and drawings of the fan case 510.

The fan case 510 includes the annular outer shroud 512, the liner 514, and a number of liner plates 516. The first liner segment 515A, the second liner segment 515B spaced apart from the first liner segment 515A, and one of the liner plates 516 is shown in FIG. 11.

The liner plate 516 extends along the outer radial surface 554 of the first liner segment 515A, through the gap 552, and along the inner radial surface 556 of the second liner segment 515B as shown in FIG. 11. The liner plate 516 is coupled to the first and second liner segments 515A, 515B along the front edge 560 of the first and second liner segments 515A, 515B. In the illustrative embodiment, the blades 114 rotate in the clockwise direction from the first liner segment 515A toward the second liner segment 515B such that a released fan blade 114 travels from the first liner segment 515A toward the second liner segment 515B to cause separation of the liner plate 516 from first and second liner segments 515A, 515B to be reduced when the first liner segment 515A is spaced apart from the central axis 20 relative to the second liner segment 515B.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case adapted to extend around blades of a fan rotor included in a gas turbine engine, the fan case comprising
    an annular outer shroud arranged to extend around a central axis of the fan case so that the annular outer shroud extends circumferentially around the blades of the fan rotor,
    a first liner segment coupled to the annular outer shroud, the first liner segment including an outer radial surface coupled to an inner surface of the annular outer shroud arranged to face toward the central axis, an inner radial surface radially spaced apart from the outer radial surface that confronts the blades of the fan rotor, and liner openings that extend through the outer radial surface and the inner radial surface,
    a second liner segment coupled to the annular outer shroud, the second liner segment including an outer radial surface coupled to the inner surface of the annular outer shroud arranged to face toward the central axis, an inner radial surface radially spaced apart from the outer radial surface that confronts the blades of the fan rotor, and liner openings that extend through the outer radial surface and the inner radial surface, and a liner plate coupled to one of the outer radial surface and the inner radial surface of the first liner segment and coupled to one of the outer radial surface and the inner radial surface of the second liner segment to cause the second liner segment to move in response to movement of the first liner, wherein the liner plate is formed to include plate openings that align with the liner openings formed in the first liner segment and the second liner segment to receive fasteners included in the fan case to couple the liner plate to the first liner segment and the second liner segment.

2. The fan case of claim 1, wherein the first liner segment includes an intermediate surface extending between the inner radial surface and the outer radial surface, the intermediate surface intersects the outer radial surface to define a front edge of the first liner segment, and the liner plate extends circumferentially along the front edge of the first liner segment.

3. The fan case of claim 1, wherein the first liner segment includes an intermediate surface extending between the inner radial surface and the outer radial surface, the intermediate surface intersects the outer radial surface to define a front edge of the first liner segment, the second liner segment includes an intermediate surface extending between the inner radial surface and the outer radial surface, the intermediate surface intersects the outer radial surface to define a front edge of the second liner segment, and the liner plate extends circumferentially along the front edge of the first and second liner segments.

4. The fan case of claim 1, wherein the first liner segment includes an intermediate surface extending between the inner radial surface and the outer radial surface, the intermediate surface intersects the outer radial surface to define a front edge of the first liner segment, and the liner plate is spaced apart axially from the front edge of the first liner segment.

5. The fan case of claim 4, wherein the second liner segment includes an intermediate surface extending between the inner radial surface and the outer radial surface, the intermediate surface intersects the outer radial surface to define a front edge of the second liner segment, and the liner plate is spaced apart axially from the front edge of the second liner segment.

6. The fan case of claim 1, wherein the liner plate includes a band aligned to extend circumferentially between the first and second liner segments and a strip arranged to extend axially along the first and second liner segments.

7. The fan case of claim 6, wherein the band has a band axial thickness and the strip has a strip axial thickness that is greater than the band axial thickness.

8. The fan case of claim 6, wherein the first liner segment includes an intermediate surface extending between the inner radial surface and the outer radial surface, the intermediate surface intersects the outer radial surface to define a front edge of the first liner segment, the second liner segment includes an intermediate surface extending between the inner radial surface and the outer radial surface, the intermediate surface intersects the outer radial surface to define a front edge of the second liner segment, and the band of the liner plate extends circumferentially along the front edge of the first and second liner segments.

9. The fan case of claim 1, wherein the liner plate is coupled to the outer radial surface of the first liner segment, and the liner plate is coupled to the inner radial surface of the second liner segment.

10. The fan case of claim 9, wherein the first liner segment includes an intermediate surface extending between the inner radial surface and the outer radial surface, the intermediate surface intersects the outer radial surface to define a front edge of the first liner segment, and the liner plate extends circumferentially along the front edge of the first liner segment.

11. The fan case of claim 9, wherein the first liner segment includes an intermediate surface extending between the inner radial surface and the outer radial surface, the intermediate surface intersects the outer radial surface to define a front edge of the first liner segment, and the liner plate is spaced apart axially from the front edge of the first liner segment.

12. The fan case of claim 9, wherein the second liner segment is circumferentially spaced apart from the first liner segment to form a gap therebetween and the liner plate extends through the gap between the outer radial surface of the first liner segment and the inner radial surface of the second liner segment.

13. The fan case of claim 1, wherein the liner openings are threaded to receive the fasteners.

14. A fan case adapted to extend around blades of a fan rotor included in a gas turbine engine, the fan case comprising an annular outer shroud arranged to extend around a central axis of the fan case so that the annular outer shroud is aligned axially with and extends circumferentially around the blades of the fan rotor, a first liner segment coupled to the annular outer shroud, the first liner segment having an inner radial surface that confronts the blades of the fan rotor to define a first portion of an air flow path through the fan case, a second liner segment coupled to the annular outer shroud, the second liner segment having an inner radial surface that confronts the blades of the fan rotor to define a second portion of the air flow path through the fan case, and a liner plate coupled to the first liner segment and the second liner segment to cause the second liner segment to move in response to movement of the first liner segment, wherein the annular outer shroud extends between a front end of the fan case and a back end of the fan case, the annular outer shroud includes a front hook adjacent to the front end of the fan case, a back hook adjacent to the back end of the fan case, and an intermediate hook located axially between the front and back hooks, the first and second liner segments are formed to be radially spaced apart from an inner surface of the annular outer shroud between the front and intermediate hooks to form a blade-retention cavity therebetween, and the liner plate is located axially between the front and intermediate hooks, and wherein the fan case further includes fasteners that each extend through plate openings formed in the liner plate and into one of the first liner segment and the second liner segment to couple the liner plate to the first liner segment and the second liner segment.

15. A fan case adapted to extend around blades of a fan rotor included in a gas turbine engine, the fan case comprising an annular outer shroud arranged to extend around a central axis of the fan case so that the annular outer shroud is aligned axially with the blades of the fan rotor, the annular outer shroud having an inner surface that extends circumferentially around the blades of the fan rotor, a first liner segment coupled to the annular outer shroud, the first liner segment having an outer radial surface coupled to the inner radial surface of the annular outer shroud and an inner radial surface that defines a first portion of an air flow path through the fan case, a second liner segment coupled to the annular outer shroud, the second liner segment having an outer radial surface coupled to the inner radial surface of the annular outer shroud and an inner radial surface spaced apart from the outer radial surface that defines a second portion of the air flow path through the fan case, and a liner plate coupled to the first liner segment and the second liner segment to cause the second liner segment to move in response to movement of the first liner segment in response to the first liner segment being contacted by a released fan blade included in the blades of the fan rotor, wherein the liner plate is coupled to the inner radial surface of the first liner segment and to one of the outer radial surface and the inner radial surface of the second liner segment.

16. The fan case of claim 15, wherein the first liner segment and the second liner segment each include an outer tray coupled to the annular shroud, an liner-filler body bonded to the outer tray radially inward of the outer tray and configured to reinforce the first liner segment and the second liner segment, and an inner tray bonded to the liner-filler body to define the inner radial surface of the first liner segment and the second liner segment.

17. The fan case of claim 16, wherein the liner-filler body is formed in a honeycomb arrangement.

18. The fan case of claim 16, wherein the inner tray is an abradable layer.

19. The fan case of claim 15, wherein the fan case includes fasteners that each extend through plate openings formed in the liner plate and into one of the first liner segment and the second liner segment to couple the liner plate to the first liner segment and the second liner segment.

20. The fan case of claim 15, wherein the first liner segment and the second liner segment are spaced radially inward from the inner surface of the annular outer shroud to define a blade retention cavity between the inner surface of the annular outer shroud and the outer radial surface of the first liner segment and the second liner segment.

* * * * *